United States Patent
Estes et al.

(10) Patent No.: US 9,450,974 B2
(45) Date of Patent: Sep. 20, 2016

(54) INTRUSION MANAGEMENT

(71) Applicant: International Business Machines Corporation, Armonk, NY (US)

(72) Inventors: Philip F. Estes, Palmyra, VA (US); George C. Wilson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 114 days.

(21) Appl. No.: 14/220,444

(22) Filed: Mar. 20, 2014

(65) Prior Publication Data

US 2015/0271193 A1    Sep. 24, 2015

(51) Int. Cl.
G06F 11/00    (2006.01)
H04L 29/06    (2006.01)

(52) U.S. Cl.
CPC ................ H04L 63/1416 (2013.01)

(58) Field of Classification Search
CPC ........... H04L 63/1416; H04L 63/1441; H04L 63/145; H04L 63/14; H04L 63/1408
See application file for complete search history.

(56) References Cited

U.S. PATENT DOCUMENTS

| | | | | |
|---|---|---|---|---|
| 7,424,744 B1* | 9/2008 | Wu | ............ | H04L 63/1416 370/392 |
| 8,261,353 B2* | 9/2012 | Hirsave | ............ | G06F 21/577 713/152 |
| 2003/0084322 A1* | 5/2003 | Schertz | ............ | G06F 21/55 726/23 |
| 2003/0110393 A1* | 6/2003 | Brock | ............ | G06F 21/554 726/23 |
| 2004/0255167 A1* | 12/2004 | Knight | ............ | G06Q 10/10 726/24 |
| 2007/0044153 A1 | 2/2007 | Schuba et al. | | |
| 2009/0144827 A1 | 6/2009 | Peinado et al. | | |
| 2011/0030057 A1 | 2/2011 | Chen et al. | | |
| 2012/0036577 A1* | 2/2012 | Bolzoni | ............ | H04L 12/2602 726/23 |
| 2013/0014265 A1 | 1/2013 | Panjwani | | |
| 2013/0219500 A1 | 8/2013 | Lukas et al. | | |

FOREIGN PATENT DOCUMENTS

| | | |
|---|---|---|
| EP | 1819126 A1 | 8/2007 |
| WO | 2010105516 A1 | 9/2010 |

OTHER PUBLICATIONS

Lippmann, R., et al., "The Effect of Identifying Vulnerabilities and Patching Software on the Utility of Network Intrusion Detection," A. Wespi, G. Vigna, and L. Deri (Eds.): RAID 2002, LNCS 2516, pp. 307-326, 2002. © Springer-Verlag Berlin Heidelberg 2002.

Unknown, "Common Attack Pattern Enumeration and Classification", The Mitre Corporation. Copyright © 2007-2013, The MITRE Corporation http://capec.mitre.org/.

* cited by examiner

*Primary Examiner* — Esther B Henderson
(74) *Attorney, Agent, or Firm* — Jay Wahlquist; Steven L. Bennett (57) ABSTRACT

A computer implemented method for managing a network intrusion is disclosed. The method can include monitoring, by an intrusion management system, a set of nodes of a computer network. The method can also include determining a node workload for the set of nodes. Further, the method can include classifying an intrusion signature for the network intrusion. Classifying the intrusion signature can be performed in response to detecting a network intrusion related to the set of nodes. The method can include determining a response for managing a security vulnerability of the set of nodes based on the node workload and the intrusion signature. The method can also include instantiating, by the intrusion management system, the response to the set of nodes.

20 Claims, 6 Drawing Sheets

INTRUSION MANAGEMENT

BACKGROUND

Aspects of the present disclosure relate to various embodiments of a system, methodology, and computer program product for network intrusion management. More particular aspects relate to determining and executing a response to manage a network intrusion.

The use of networked computer systems in today's business world is steadily increasing. Protecting computer networks from unauthorized network intrusions is an important part of maintaining secure computer networks. Intrusion response systems are one tool that can be used to facilitate network security. As the use of networked computer systems increases, the need for intrusion response systems may also increase.

SUMMARY

Aspects of the present disclosure, in certain embodiments, are directed toward a computer implemented method for network intrusion management. In certain embodiments, the method can include monitoring, by an intrusion management system, a set of nodes of a computer network. The method can include determining, by the intrusion management system, a node workload for the set of nodes. In certain embodiments, the method can include classifying, by the intrusion management system, an intrusion signature for the network intrusion. Classifying the intrusion signature can, in certain embodiments, be performed in response to detecting a network intrusion related to the set of nodes. The method can also include determining, by the intrusion management system, a response for managing a security vulnerability of the set of nodes based on the node workload and the intrusion signature. Additionally, the method can include instantiating, by the intrusion management system, the response to the set of nodes.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system, methodology, and computer program product for network intrusion management. More particular aspects relate to determining and executing a response to manage a network intrusion. The methodology may include monitoring, by an intrusion detection system, a set of nodes in a computer network. The methodology may include determining, by an intrusion management database coupled to the intrusion detection system, a node workload for the set of nodes. In response to detecting a network intrusion related to the set of nodes, the methodology can include classifying an intrusion signature for the network intrusion. Further, the methodology can include determining a response for managing a security vulnerability of the set of nodes based on the node workload and the intrusion signature. The methodology can also include instantiating, by the intrusion detection system, the response to the set of nodes.

Networked computer systems are an important part of today's business world. With the increase of information available on the Internet, and the corresponding increase of network technology used by companies both large and small, the complexity of networked computer systems continues to increase. One important aspect of networked computer systems is security, which includes deterring unauthorized agents from intruding on the network. Networked computer systems routinely perform system updates to obtain the most recent security patches, and increase their preparedness for network intrusions. Further, Network Intrusion Detection Systems (NIDS) have been developed that allow a system to identify certain attack signatures, and determine an appropriate response to mitigate an attack. Aspects of the present disclosure relate to the recognition that, in certain situations, applying patches to computer systems to prepare for potential network intrusions can involve system downtime while maintenance is performed. Further, given the growing number of potential network threats, applying corresponding patches for each threat in advance can increase the frequency of system maintenance and further extend system downtime. Accordingly, aspects of the present disclosure relate to a method and system for deferring a patch application or other system response until the system is under attack. More particularly, the present disclosure relates to identifying attack signatures and potential security vulnerabilities and to determining a response (e.g., a patch application, traffic redirection, or other response) to mitigate the particular intrusion in progress. The present disclosure may provide benefits associated with increased network security and decreased system downtime.

Aspects of the present disclosure include a method and system for managing a network intrusion (similarly referred to herein as a network attack, or simply an attack). More particular aspects relate to determining and executing a response to manage a network intrusion. The method and system may work on a number of devices and operating systems. Aspects of the present disclosure include monitoring a set of nodes in a computer network. Monitoring may include using an intrusion detection system. The intrusion detection system may be configured to detect a network intrusion and initiate a response to manage the network intrusion. Further, the method can include identifying irregular behavior in network traffic directed to or from the set of nodes and providing a behavior report to an intrusion management database. The intrusion management database may be coupled to the intrusion detection system. Aspects of the present disclosure include determining a node workload for the set of nodes. In certain embodiments, the node workload for the set of nodes may be determined by an intrusion management database. In certain embodiments, the node workload can include information regarding the network traffic load and an active application of the set of nodes. Further aspects of the present disclosure are directed toward correlating a relationship between the active application of the set of nodes and the network traffic load. Additionally, the method can include providing information regarding the relationship between the active application and the network traffic load to the intrusion management database.

Aspects of the present disclosure can include classifying, in response to detecting a network intrusion related to the set of nodes, an intrusion signature for the network intrusion. In certain embodiments, classifying the network intrusion can be determined by the intrusion detection system. Aspects of the present disclosure can include determining a response for managing a security vulnerability of the set of nodes based on the node workload and the intrusion signature. Determining the response can, in certain embodiments, include using an intrusion response system. Further, classifying an intrusion signature can include comparing a behavior report to a catalogue of intrusion signatures maintained in an intrusion management database.

Aspects of the present disclosure can include instantiating, by the intrusion detection system, the response to the set of nodes. In certain embodiments, each node of the set of nodes can report protocol data, port use activity data, and other workload information to the intrusion management database. Based on the workload information reported by each node of the set of nodes, the method can include determining a response to manage a network intrusion. In certain embodiments, the response can include protecting the set of nodes by redirecting network traffic to and from the set of nodes. In certain embodiments, the response can include applying a security patch to the set of nodes. Other sorts of responses to manage the security vulnerability of the set of nodes are also possible.

Figure 1:
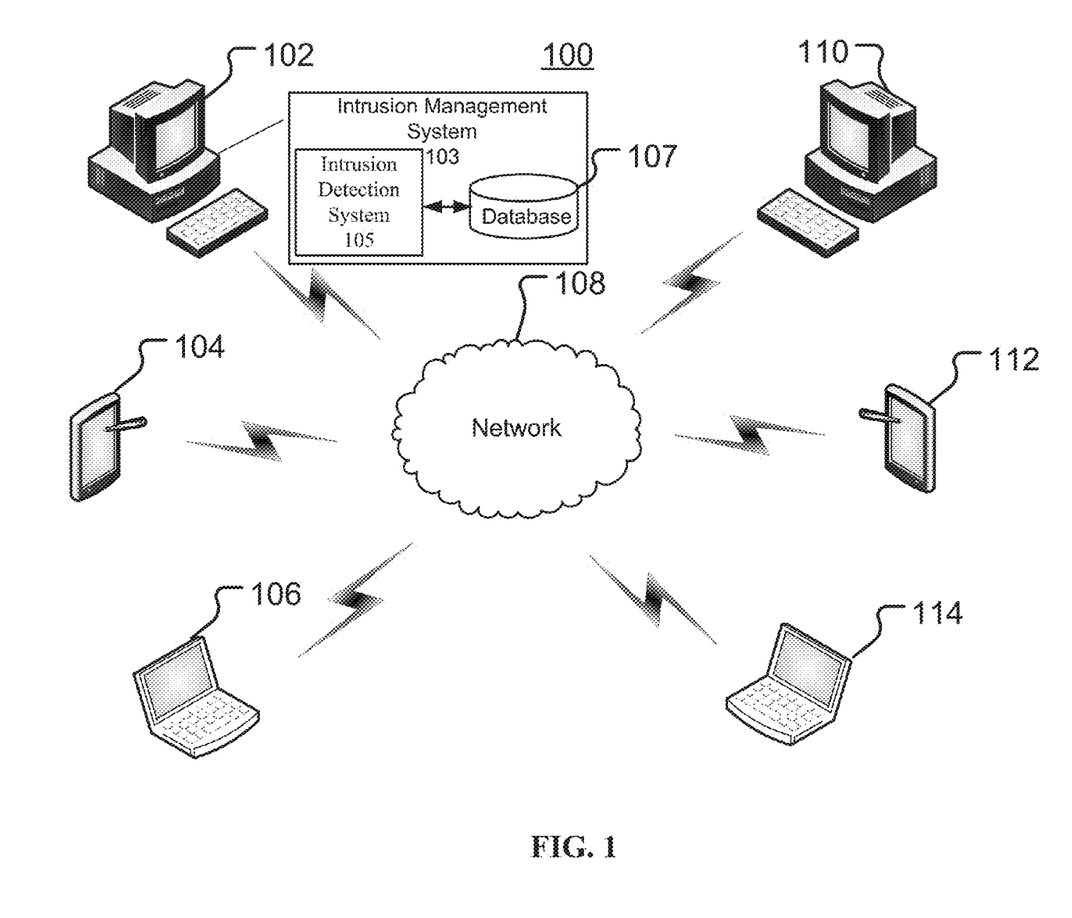
FIG. 1 is a diagrammatic illustration of an exemplary computing environment for managing a network intrusion, according to embodiments.

Turning now to the figures, FIG. 1 is a diagrammatic illustration of an exemplary computing environment, consistent with embodiments of the present disclosure. Specifically, the environment 100 can include one or more network nodes (similarly referred to herein simply as nodes) 102, 104, 106, 110, 112, 114. The network nodes 102, 104, 106, 110, 112, 114 may be remote from each other and communicate over a network 108. Alternatively, in certain embodiments, the network nodes may be configured in any other suitable relationship (e.g., in a peer-to-peer or other relationship).

The network 100 can be implemented by any number of any suitable communications media (e.g., wide area network (WAN), local area network (LAN), Internet, Intranet, etc.). Alternatively, the network nodes 102, 104, 106, 110, 112, 114 may be local to each other and communicate via any appropriate local communication medium (e.g., local area network (LAN), hardwire, wireless link, Intranet, etc.).

In certain embodiments, network node 102 can include an intrusion management system 103. The intrusion management system 103 can facilitate monitoring of a set of nodes of a computer network (e.g., network nodes 102, 104, 106, 110, 112, 114 of FIG. 1), determining a node workload for the set of nodes, classifying an intrusion signature for a network intrusion, determining a response for managing a security vulnerability of the set of nodes based on the node workload and the intrusion signature, and instantiating a response to the set of nodes. In certain embodiments, the intrusion management system 103 can include an intrusion detection system 105 communicatively coupled with an intrusion management database 107. In certain embodiments, the intrusion detection system 105 can be configured to detect a network intrusion directed toward one or more network nodes and consult the network intrusion management database 107 for direction on how to manage the intrusion.

Network nodes 102, 104, 106, 110, 112, 114 may be implemented by conventional or other computer systems preferably equipped with a display or monitor; a base, where the base includes at least one processor); memory and/or internal or external network interface or communications devices (e.g., modem, network cards, etc.); optional input devices (e.g., a keyboard, mouse, or other input device); and any commercially available or custom software (e.g., browser software, communications software, server software, natural language processing software, search engine and/or web crawling software, filter modules for filtering content based upon predefined criteria, etc.). The computer systems may include server, desktop, laptop, and hand-held devices. In certain embodiments, the computer systems may include tablets, cell phones, smart phones, personal digital assistants, or other mobile devices. The computer systems may include one or more modules or units to perform the various functions of present disclosure embodiments described below (e.g., determining a node workload for a set of nodes, classifying an intrusion signature for a network intrusion, determining a response for managing a security vulnerability of the set of nodes based on the node workload and the intrusion signature, instantiating a response to the set of nodes, etc.) and may be implemented by any combination of any quantity of software and/or hardware modules or units.

Consistent with various embodiments the network nodes 102, 104, 106, 110, 112, 114 can include a network interface device, a BIOS (basic input-output system), an operating system, one or more processors or processing units, a system memory, and some form of computer-readable media. The network interface device can facilitate communication between the network nodes 102, 104, 106, 110, 112, 114 and the network 108. In certain embodiments, the various components of the network nodes can be coupled together by a system bus.

In certain embodiments, the network nodes 102, 104, 106, 110, 112, 114 can include a BIOS and an operating system accessible by the system memory. The BIOS and the operating system can facilitate the transfer of information between elements within the network nodes as well as the implementation of application programs and other program modules. A user interface that allows a user to interact with the application programs and program modules of the network nodes can also be linked to the network nodes. For example, the user interface can include a display, such as a computer monitor, and an input device, such as a keyboard, a touch screen, or a pointing device (e.g., a mouse, trackball, pen, or touch pad).

In certain embodiments, the network nodes 102, 104, 106, 110, 112, 114 can include one or more forms of computer-readable media. For example, computer-readable media can include storage media, such as random-access memory (RAM), read-only memory (ROM), electrically erasable programmable read-only memory (EEPROM), flash memory, hard disks, optical disk storage, or other mediums that can be used to store information that can be accessed by the network nodes. Additionally, computer-readable media can include communication media, such as computer-readable instructions, data structures, and program modules. Wired media, such as a wired network or a direct-wired connection, and wireless media, such as acoustic, radio frequency, infrared, and other wireless media are further examples of communication media. Combinations of the above are also included within the scope of computer-readable media.

Figure 2:
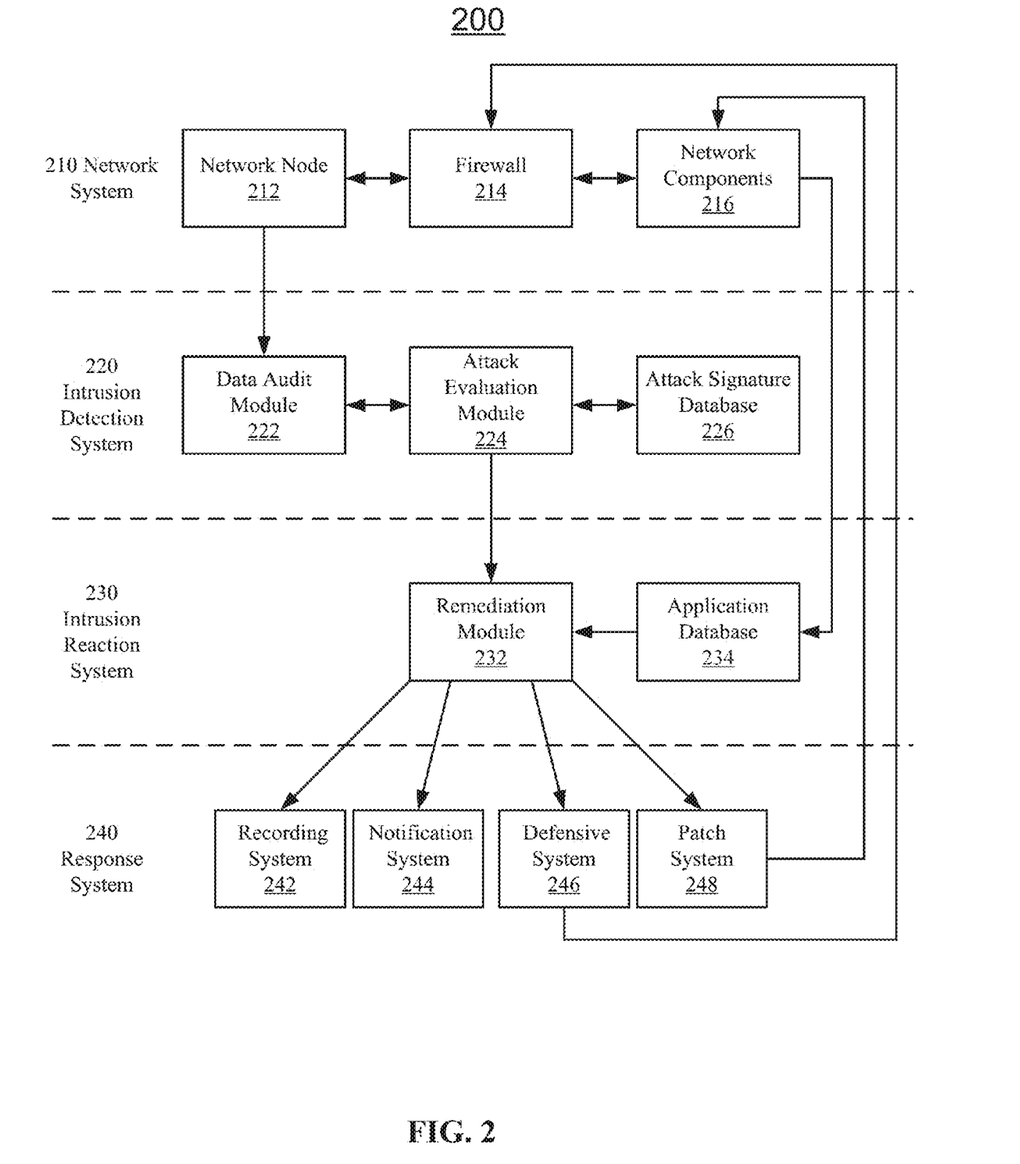
FIG. 2 illustrates an exemplary network system architecture for managing a network intrusion, according to embodiments.

FIG. 2 illustrates an exemplary network system architecture 200 for managing a network intrusion (similarly referred to herein as a network attack, or simply an attack), consistent with embodiments of the present disclosure. Aspects of FIG. 2 are directed toward a network system architecture 200 that facilitates the implementation of an application for managing a network intrusion. Consistent with various embodiments, the network system architecture 200 can include a network system 210, an intrusion detection system 220, an intrusion reaction system 230, and a response system 240. As shown in FIG. 2, each system of the network system architecture 200 may include one or more modules, systems, or components configured to facilitate the implementation of a method and system for managing a network intrusion.

Consistent with various embodiments, as shown in FIG. 2, the network system 210 may include a network node 212, a firewall 214, and network components 216. The network node 212, firewall 214, and network components 216 may be communicatively connected to one another, or to other components within the system architecture 200. In certain embodiments, the network node 212 can be a desktop computer, laptop computer, server, smartphone, tablet, mobile device, or other computing device communicatively connected to the other components of the network system architecture 200. In certain embodiments, the network node 212 may be an "edge" node of the network, and be configured to implement an application to manage a network intrusion directed toward one or more components of the network components 216. In certain embodiments, the network node 212 may be on an external network relative to that of the network components 216. The firewall 214 can be a software-based security system configured to control the incoming and outgoing network traffic between the network node 212 and the networks components 216. For instance, the firewall 214 can be configured to analyze the data packets routed between the network node 212 and the network components 216 and determine whether they should be allowed through or not based on an applied rule set. As an example, the firewall 214 can inspect the header information of the data packets, and deter those packets with irregular IP addresses or protocols.

As shown in FIG. 2, consistent with various embodiments, the intrusion detection system 220 can include a data audit module 222, an attack evaluation module 224, and an attack signature database 226. The data audit module 222 can be configured to monitor the network activity of the network node 212 or other network components (e.g., network components 216). In certain embodiments, the data audit module 222 can sample data packets from the network node 212, and report network activity data to the attack signature database 226. For instance, the network activity data can include information regarding which ports and protocol are in use by the network node 212. As an example, the network activity data could specify that a certain port is in use by an internet browsing protocol. The attack signature database can, in certain embodiments, maintain a catalog of attack signatures and security response protocols. The network activity data can be logged in the attack signature database 226 and be used in identifying and classifying a potential network intrusion. The attack evaluation module 224 can be configured to analyze the network activity data provided by the data audit module 222 and identify suspicious patterns, behaviors, or signatures that may be indicative of a potential network intrusion based on the attack signature information maintained in the attack signature database 226.

Consistent with various embodiments, the intrusion reaction system 230 can include a remediation module 232 and an application database 234. The remediation module 232 can be communicatively connected to the attack module 224 and the application database 234. The application database 234 can be communicatively connected to the network components 216. In certain embodiments, the application database 234 can be configured to maintain information regarding the workload of each component of the network components 216. The workload may include information such as the active processes, program modules, and applications of the network components, as well as respective network traffic, protocol, and port usage data for each component of the network components 216. In certain embodiments, the application database 234 may be dynamically updated in real time. In certain embodiments, each component of the network components 216 can provide information regarding its workload to the application database 234. In certain embodiments, a traffic monitoring agent can correlate a relationship between the active application processes and network traffic of each network component and provide information regarding runtime processes and their respective protocol and port information to the application database 234.

In certain embodiments, the remediation module 232 can be configured to determine an action or response to take regarding a network intrusion. In certain embodiments, the remediation module 232 can be configured to receive attack signature information from the attack evaluation module 224 regarding the nature of the network intrusion (e.g., which resources are targeted by the intrusion, the severity of the intrusion, etc.), and correlate this information with the workload information (e.g., runtime processes, protocol information, port usage data, etc.) maintained in the application database 234 to determine a response for the network intrusion. The remediation module 232 may choose one or more actions from a number of response systems to manage the network intrusion.

As shown in FIG. 2, response system 240 can include a recording system 242, a notification system 244, a defensive system 246, and a patch system 248. The recording system 242 can be configured to maintain a log of the attack vector of each network intrusion, as well as any other responses that are initiated to manage the network intrusion. The notification system 244 can, in certain embodiments, notify a user of the network intrusion and defer to human intervention to manage the intrusion. The defensive system 246 can be configured to redirect network traffic to or from the target of the network intrusion. For example, in certain embodiments, the defensive system 246 can be communicatively connected to the firewall 214, and can direct the firewall to change data routing for a particular network node, subnet, or port to protect one or more targeted systems or nodes. The patch system 248 can be configured to apply a security patch to the targeted system to manage the network intrusion. In certain embodiments, the patch system 248 can be communicatively connected to the network components 216 and be configured to deliver a security patch based on the intrusion detection signature to manage the attack. Alternatively, the patch system 248 could direct the targeted system to take a different action, such as performing a system reboot.

Figure 3:
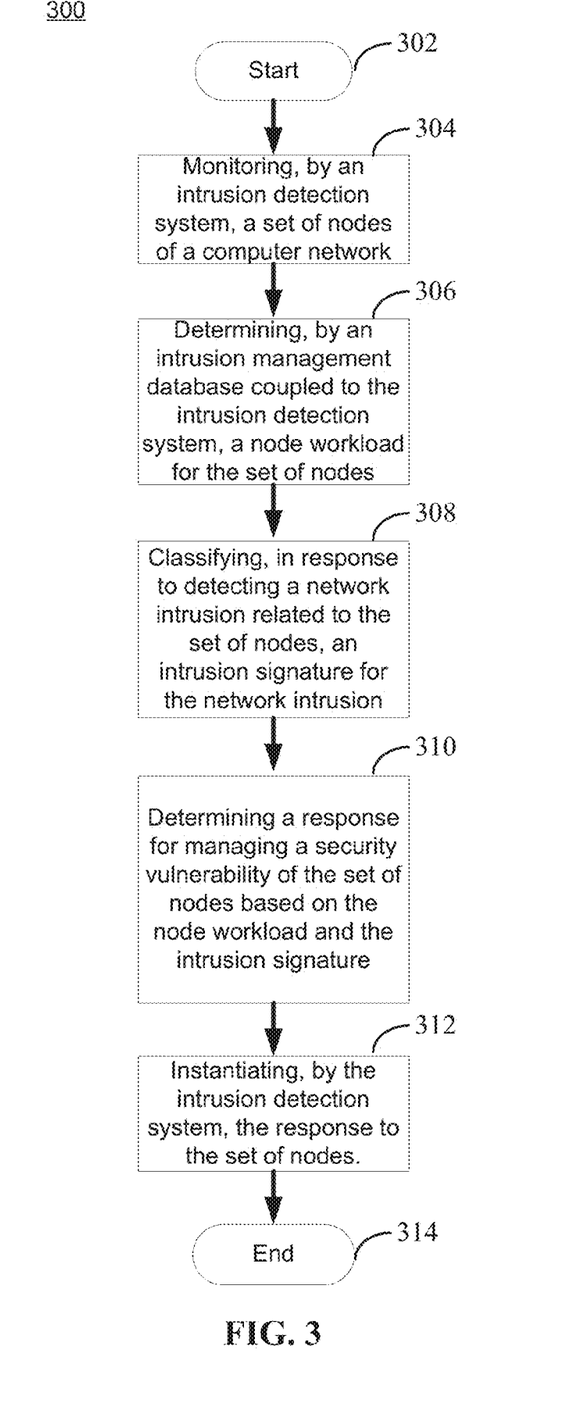
FIG. 3 is a flowchart illustrating a method for managing a network intrusion, according to embodiments.

FIG. 3 is a flowchart illustrating a method 300 for managing a network intrusion, consistent with embodiments of the present disclosure. Aspects of FIG. 3 are directed toward determining and instantiating a response to manage a network intrusion. The method 300 may begin at block 302. Consistent with various embodiments, the method can include a monitoring block 304, a workload determining block 306, a classifying block 308, a response determining block 310, and an instantiating block 312. Consistent with various embodiments, the method may end at block 314.

Consistent with various embodiments, at block 304 the method 300 may include monitoring a set of nodes of a computer network. The set of nodes can, for example, include desktop computers, laptop computers, servers, tablets, smart phones, or other devices. In certain embodiments, the monitoring can be performed by an intrusion detection system (intrusion detection system 220 of FIG. 2). Monitoring the set of nodes of the computer network may, in certain embodiments, include overseeing the network traffic directed to and from the set of nodes and identifying any suspicious traffic or irregular behavior that may be indicative of potential network intrusions. As an example, monitoring can include watching for port scans, probes, remote logon attempts, sudden increases in overall traffic, or other signs that may indicate a potential network intrusion. In certain embodiments, monitoring the set of nodes can further include providing information regarding any identified suspicious traffic or irregular behavior to an intrusion management database (e.g., attack signature database 226 of FIG. 2).

Consistent with various embodiments, at block 306 the method 300 may include determining a node workload for the set of nodes. In certain embodiments, the node workload for the set of nodes can be determined by an intrusion management database (such as application database 234 of FIG. 2). The node workload may include information regarding the active processes, program modules, and applications of the set of nodes, as well as respective network traffic, protocol, and port usage data for each node of the set of nodes. In certain embodiments, determining the node workload for the set of nodes can include receiving a workload report from each node of the set of nodes. In certain embodiments, determining the workload for the set of nodes can include correlating a relationship between an active application process and network traffic for each node of the set of nodes. Correlating the relationship between the active application process and network traffic can be performed by a traffic agent external to the set of nodes. Further, determining the workload for the set of nodes can include providing information regarding the relationship between the active application process and network traffic to the intrusion management database (e.g., application database 234 of FIG. 2).

Consistent with various embodiments, at block 308 the method 300 can include classifying an intrusion signature for a detected network intrusion. In certain embodiments, the network intrusion may target one or more nodes of the set of nodes. In certain embodiments, the network intrusion can be detected based on irregular behavior observed while monitoring the set of nodes. For example, the irregular behavior could include sudden increases in network traffic directed to one or more nodes of the set of nodes. Classifying the intrusion signature may, in certain embodiments, include comparing the irregular behavior with a catalog of intrusion signatures maintained on an intrusion management database (e.g., attack signature database 226 of FIG. 2), and labeling the intrusion signature as belonging to one or more known categories of network intrusion. As an example, in response to observing a sudden increase in network traffic directed to one or more nodes of the set of nodes, the method 300 can include consulting the intrusion management database, and comparing this behavior to a catalog of intrusion signatures. In certain embodiments, the behavior may be classified as a denial-of-service attack.

Consistent with various embodiments, at block 310 the method 300 can include determining a response for managing a security vulnerability of the set of nodes. In certain embodiments, determining the response for managing the security vulnerability can include using an intrusion reaction system (such as intrusion reaction system 230). In certain embodiments, the response can be determined based on a node workload and the intrusion signature. In certain embodiments, an application or process currently active on one or more of the nodes may make the node or set of nodes susceptible to a network intrusion. As an example, an application active on a particular node may have a security vulnerability that makes the node or set of nodes vulnerable to a password-based attack (e.g., password theft) or remote logon. Accordingly, the response to manage the network intrusion can be chosen based on the currently active application as well as the type of network intrusion.

Further aspects of the present disclosure relate to deferring a security patch or other intrusion management response based on the node workload information. For example, in certain embodiments, a network intrusion targeting a specific protocol or application of a particular node may be detected, but the targeted protocol or application may not be active on the node at the time of the network intrusion. In such situations, application of a security patch or other intrusion management response can be deferred to a later time (e.g., when the node workload is actively running the targeted protocol or application). As an example, a network intrusion targeting a webserver protocol may be directed at a particular node; however, the targeted webserver protocol may not be active on the node at the time of the network intrusion. Accordingly, application of a security patch or other intrusion management response can be deferred until the webserver protocol is running (e.g., active in the memory) on the targeted node. Such a configuration may provide benefits associated with reduced system downtime.

Consistent with various embodiments, at block 312 the method 300 can include instantiating the response to the set of nodes. As described herein, the response can be determined based on the workload of the targeted node and the intrusion detection signature. The response can be one of a number of different methods to manage the network intrusion. In certain embodiments, more than one response can be selected to manage the network intrusion. Consistent with various embodiments of the present disclosure, the response can include recording the path of an attack vector, as well as any other responses or patches implemented to mitigate the network intrusion, and storing the record in a database for later analysis. Recording the path of an attack vector and any corresponding responses may provide information that can be used to help identify or mitigate future attacks. In certain embodiments, the response can include notifying a user of the network intrusion and deferring to human management of the intrusion. For example, an alert could appear in a user interface of a display connected to the targeted node, informing a user of the attack, and providing recommended actions that the user could perform to manage the attack.

In certain embodiments, the response can include defending the node or set of nodes by redirecting network traffic away from the node or set of nodes. As an example, the response could include increasing the security of a firewall component to prevent allowance of potentially unsafe data packets. As an additional example, in certain embodiments, in response to an intrusion signature being classified as a denial-of-service attack, the response can include directing a router to route the malicious data packets away from the targeted node. Additional responses may include managing the ports, network protocols, or subnets associated with the node or nodes. Other types of responses are also possible.

In certain embodiments, the response can include applying a security patch to one or more nodes in order to manage the network intrusion. For example, in response to classifying an intrusion signature, the method 300 can include dynamically instantiating a patch to the targeted system in order to mitigate the specific network intrusion currently in progress. For example, the patch may address a security vulnerability exploited by the current network intrusion, and update the targeted node to remove the security vulnerability and mitigate the network intrusion. Deferring patch application until detection of a network intrusion may provide benefits associated with reduced system downtime.

Figure 4:
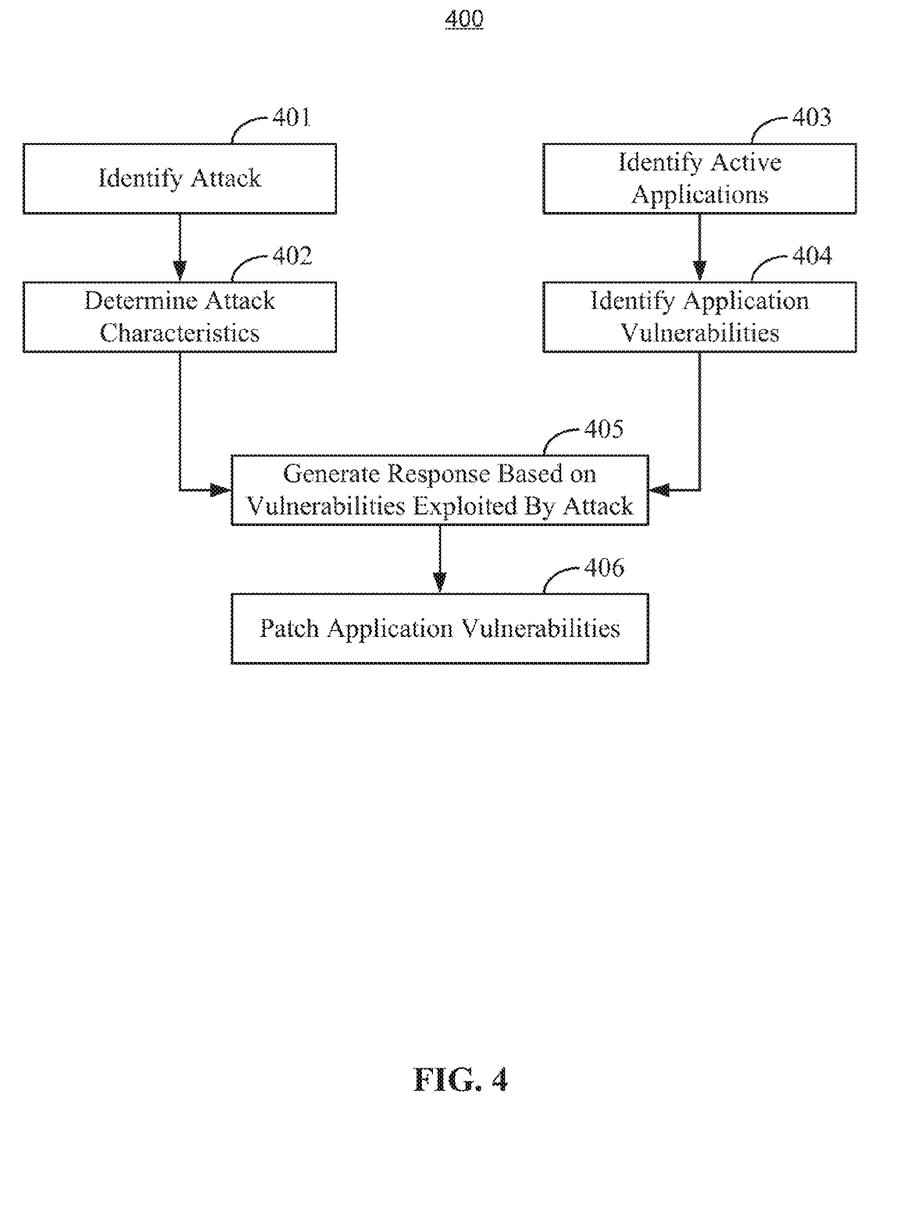
FIG. 4 is flowchart illustrating a method for applying a patch to mitigate a network intrusion, according to embodiments.

FIG. 4 is flowchart illustrating a method 400 for applying a patch to mitigate a network intrusion, consistent with various embodiments. Consistent with various embodiments, the method 400 can include an identify attack block 401, a determine attack characteristics block 402, an identify active applications block 403, an identify application vulnerabilities block 404, a generate response based on vulnerabilities exploited by attack block 405, and a patch application vulnerabilities block 406.

Consistent with various embodiments, at block 401, the method 400 can include identifying an attack or network intrusion. As discussed herein, identifying the attack can include detecting irregular network behavior or an attack signature. In certain embodiments, detecting irregular network behavior or an attack signature can be performed by a data audit module (e.g., data audit module 222 of FIG. 2). At block 402, the method 400 can include determining characteristics of the intrusion. For example, characteristics of the intrusion may indicate that it is a remote logon attempt, data theft, denial-of-service attack, or other type of intrusion. In certain embodiments, determining characteristics of the intrusion may be performed by an attack signature database (for example, attack signature database 226 of FIG. 2). Consistent with various embodiments, the identify attack block 401 and determine attack characteristics block 402 may correspond to block 308 of method 300, as shown in FIG. 3.

Consistent with various embodiments, at block 403, the method 400 can include identifying active applications of the set of nodes. Identifying active applications of the set of nodes can include monitoring the active processes, program modules, and applications of the network components, as well as respective network traffic, protocol, and port usage. In certain embodiments, this information can be stored in an application database (e.g., application database 234 of FIG. 2). At block 404, the method 400 can include identifying application vulnerabilities. For example, application vulnerabilities can include unsecured scripts or unprotected processes that leave the node or system vulnerable to intrusion. In certain embodiments, information regarding the application vulnerabilities can be stored in an application database (e.g., application database 234 of FIG. 2). In certain embodiments, the identify active applications block 403 and identify application vulnerabilities block 404 may correspond to block 306 of method 300, as shown in FIG. 3.

Consistent with various embodiments, at block 405, the method 400 can include generating a response based on vulnerabilities exploited by the attack. Generating a response can include evaluating the intrusion detection signature, and determining an appropriate action to resolve the vulnerability of the application or process, thereby mitigating the attack. As an example, in certain embodiments, the application could be a network browser having a security flaw that leaves it vulnerable to a remote logon attempt. The method 400 could generate a response (e.g., a security patch) fixing the security flaw, and managing the intrusion. In certain embodiments, the generating response based on vulnerabilities exploited by attack block 405 can correspond to determining block 310 of method 300, as shown in FIG. 3.

Consistent with various embodiments, at block 406, the method 400 can include patching application vulnerabilities. As described herein, patching application vulnerabilities can include providing a software update or fix to remove a vulnerability targeted by the network intrusion. For example, the patch may address a security vulnerability exploited by the current network intrusion, and update the targeted node to remove the security vulnerability and mitigate the network intrusion. Deferring patch application until detection of a network intrusion may provide benefits associated with reduced system downtime. In certain embodiments, the patch application vulnerabilities block 406 can correspond to instantiating block 312 of method 300, as shown in FIG. 3.

Figure 5:
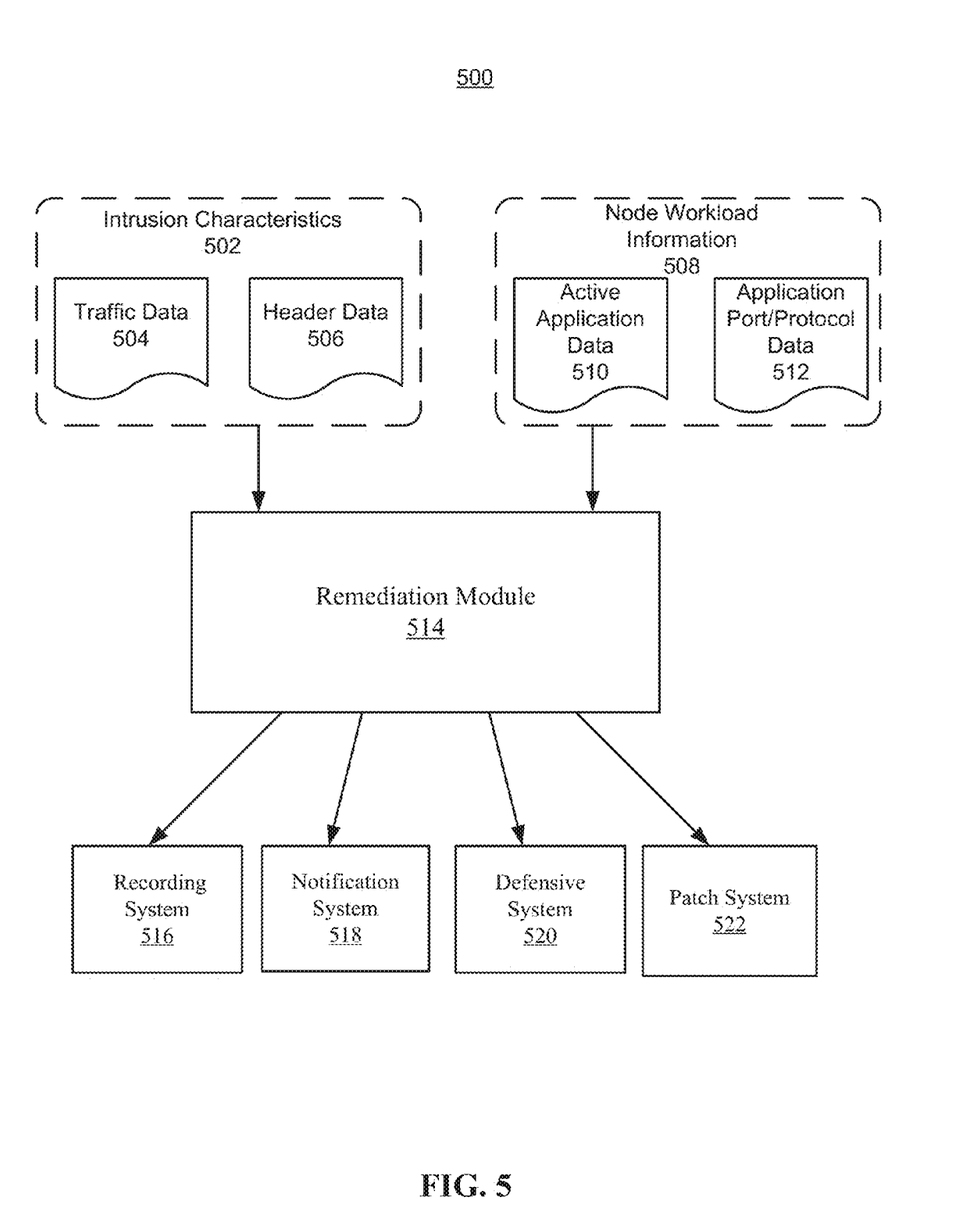
FIG. 5 is a diagrammatic illustration of an intrusion response system, according to embodiments.

FIG. 5 is a diagrammatic illustration of an intrusion response system 500, consistent with various embodiments. As shown in FIG. 5, the intrusion response system 500 can include an intrusion characteristics block 502, traffic data 504, header data 506, a node workload information block 508, active application data 510, application port/protocol data 512, a remediation module 514, a recording system 516, a notification system 518, a defensive system 520, and a patch system 522.

Consistent with various embodiments, the remediation module 514 can be configured to determine an appropriate response to manage a network intrusion. In certain embodiments, determining an appropriate response can be based on the characteristics of the network intrusion (e.g., the intrusion signature), and information regarding the workload of the targeted node. As shown in FIG. 5, the remediation module 514 can be configured to receive intrusion characteristics 502. The intrusion characteristics 502 can include a variety of information to assist the remediation module 514 in determining an appropriate response. For example, in certain embodiments, the intrusion characteristics 502 can include traffic data 504 and header data 506. The traffic data 504 can include information regarding anomalous network traffic behavior, malicious packets, and other information regarding the flow of data packets to or from a targeted node (e.g., a node or set of nodes targeted by a network intrusion). The header data 506 can include structured information transmitted between one or more applications within the network, and may contain data indicative of a network intrusion. While traffic data 504 and header data 506 were included in FIG. 5 for purposes of description, the intrusion characteristics are by no means limited to these, and may include a wide range of other information.

As shown in FIG. 5, the node work load information 508 can include active application data 510 and application port/protocol data 512. The active application data 510 can include information regarding the runtime processes, program modules, and software applications currently running on the targeted node. The application port/protocol data can include information regarding which network protocols or ports are in use on the targeted node, and which applications or runtime processes correspond to each port. As described herein, the active application data 510 and application port/protocol data 512 can be used in identifying potential security vulnerabilities, as well as network intrusion management responses.

The remediation module 514 can analyze the intrusion characteristics 502 and the node workload information 508 and use them to determine an appropriate response to manage the network intrusion. As described herein, one or more of a variety of potential responses could be selected to manage the network intrusion. As shown in FIG. 5, the responses could be handled by a recording system 516, a notification system 518, a defensive system 520, and a patch system 522. The recording system 516 can be configured to maintain a log of the attack vector of each network intrusion, as well as any other responses that are initiated to manage the network intrusion. The notification system 518 can, in certain embodiments, notify a user of the network intrusion and defer to human intervention to manage the intrusion. The defensive system 520 can be configured to redirect network traffic to or from the target of the network intrusion. For example, in certain embodiments, the defensive system 520 can be communicatively connected to a firewall component, and can direct the firewall to change data routing for a particular network node, subnet, or port to protect one or more targeted systems or nodes. The patch system 522 can be configured to apply a security patch to the targeted system to manage the network intrusion. In certain embodiments, the patch system 522 can be communicatively connected to the targeted node or nodes, and be configured to deliver a security patch based on the intrusion detection signature to manage the attack. Alternatively, the patch system 522 could direct the targeted system to take a different action, such as performing a system reboot. In certain embodiments, the remediation module 514 can correspond to the remediation module 232 of FIG. 2.

Figure 6:
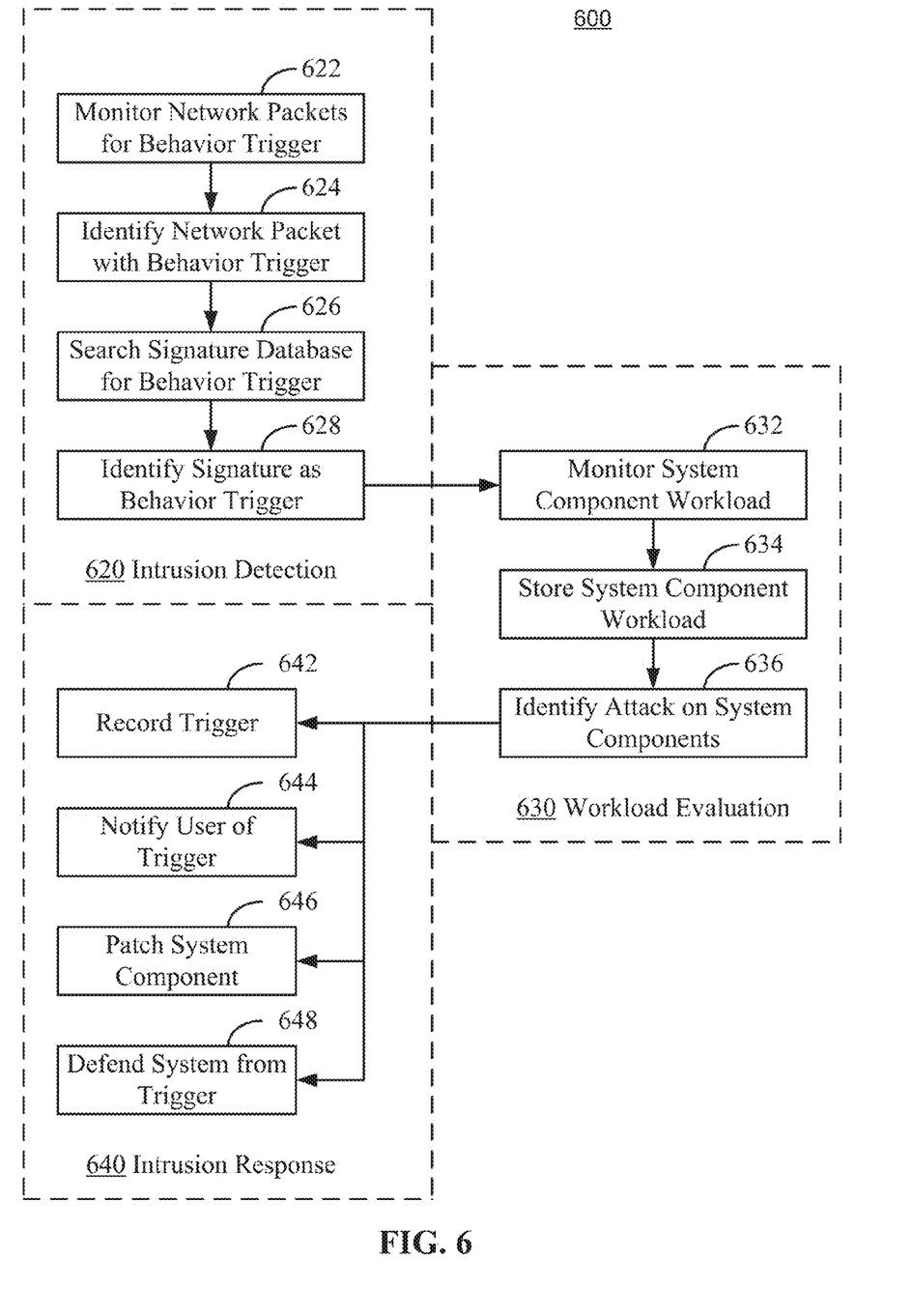
FIG. 6 is a flowchart of a method and system for an intrusion management system, according to embodiments.

FIG. 6 is a flowchart of a method and system 600 for an intrusion management system, consistent with various embodiments. Aspects of FIG. 6 are directed toward using a behavior trigger to identify a network intrusion and determining a response to manage the trigger based on the workload of the targeted system component (e.g., node). As shown in FIG. 6, the method and system 600 can include an intrusion detection system 620, a workload evaluation system 630, and an intrusion response system 640. The intrusion detection system 620 can include a monitoring for behavior trigger block 622, an identifying network packet block 624, a search block 626, and an identify signature block 628. The workload evaluation system 630 can include a monitoring block 632, a storing block 634, and an identifying block 636. The intrusion response system 640 can include a recording block 642, a notifying block 644, a patching block 646, and a defending block 648.

Consistent with various embodiments, at block 622 the intrusion detection system 620 can include monitoring network packets for a behavior trigger 622. The network packets can be formatted units of data transmitted between one or more computers in the network. Accordingly, the intrusion detection system 620 can include monitoring the network packets for a behavior trigger indicative of a potential network intrusion. For example, the behavior trigger may be a drastic, sudden increase in overall network traffic, a port scan, unscheduled system reboots, an increase in the number of packets blocked by the firewall component, or other types of irregular behavior. At block 624, the intrusion detection system 620 can include identifying a network packet with one of the aforementioned (or other) behavior triggers. In response to identifying a network packet with an irregular behavior trigger, the intrusion detection system 620 can, at block 626, include searching a signature database for the behavior trigger. The signature database can, in certain embodiments, maintain a catalog of behavior triggers and corresponding network intrusion signatures. In certain embodiments, the signature database can correspond to an attack signature database (such as attack signature database 226 of FIG. 2.) At block 628, the intrusion detection system 620 can include identifying the signature as a behavior trigger. As an example, the specific behavior trigger may be identified as being indicative of an identity spoofing (e.g., internet protocol address spoofing) attack. In certain embodiments, intrusion detection system 620 may correspond to intrusion detection system 220 of FIG. 2.

Consistent with various embodiments, at block 632 the workload evaluation system 630 may include monitoring the workload of a system component (e.g., node). In certain embodiments, monitoring the system component workload can be performed in response to identifying an intrusion signature at block 628. Monitoring the system component workload can include collecting information regarding the active processes, program modules, and applications of the system components, as well as respective network traffic, protocol, and port usage data for each component. In certain embodiments, the system workload can be monitored for irregular behavior that indicates that that an application active on the system may be targeted by a network intrusion. At block 634, the workload evaluation system 630 can include storing the system component workload. In certain embodiments, the system component workload can be stored in an application database, such as application database 234 of FIG. 2. The system component workload can be analyzed, and used to determine a response to manage the network intrusion. At block 636, the workload evaluation system 630 can include identifying an attack on the system components. For example, the attack on the system components could include a remote logon attempt or data theft attempt targeting an active application running on one of the system components.

Consistent with various embodiments, the intrusion response system 640 can include determining a response to manage or mitigate the network intrusion. As discussed herein, the intrusion response system 640 can be configured to select one or more systems to manage the intrusion. As shown in FIG. 6, the intrusion response system 640 can include a recording block 642, a notifying block 644, a patching block 646, and defending block 648. The recording block 642 can be configured to maintain a log of the irregular behavior trigger and the attack vector of each network intrusion, as well as any other responses that are initiated to manage the network intrusion. The notifying block 644 can, in certain embodiments, notify a user of the network intrusion, and defer to human intervention to manage the intrusion. The patching block 646 can be configured to apply a security patch to the targeted system to manage the network intrusion. In certain embodiments, the patching block 646 can be communicatively connected to the system components, and be configured to deliver a security patch based on the intrusion detection signature to manage the attack. Alternatively, the patching block 646 could direct the targeted system to take a different action, such as performing a system reboot. The defending block 648 can be configured to redirect network traffic to or from the target of the network intrusion. For example, in certain embodiments, the defending block 648 can be communicatively connected to a firewall component, and can direct the firewall to change data routing for a particular network node, subnet, or port to protect one or more targeted systems or nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for network intrusion management, the method comprising:
   monitoring, by an intrusion management system, a set of nodes of a computer network;
   determining, by the intrusion management system, a node workload for the set of nodes;
   classifying, by the intrusion management system, in response to detecting a network intrusion related to the set of nodes, an intrusion signature for the network intrusion;
   determining, by the intrusion management system, a response for managing a security vulnerability of the set of nodes based on the node workload and the intrusion signature; and
   instantiating, by the intrusion management system, the response to the set of nodes;
   wherein determining the response includes:
   determining a protocol or an application targeted by the network intrusion; and
   determining that the protocol or the application targeted by the network intrusion is not active at the time of the network intrusion based on the node workload;
   wherein the response includes deferring application of a security patch for the network intrusion based on determining that the protocol or the application targeted by the network intrusion is not active at the time of the network intrusion.

2. The method of claim 1, wherein the intrusion management system includes an intrusion detection system coupled to an intrusion management database, and wherein:
   monitoring the set of nodes of the computer network is performed by the intrusion detection system;
   determining the node workload for the set of nodes is performed by the intrusion management database;
   classifying an intrusion signature for the network intrusion is performed by the intrusion management database;
   determining the response for managing the security vulnerability of the set of nodes is performed by the intrusion management database; and
   instantiating the response to the set of nodes is performed by the intrusion detection system.

3. The method of claim 2, wherein monitoring a set of nodes of a computer network further comprises:
   identifying irregular behavior in network traffic involving the set of nodes; and
   providing, to the intrusion management database, a behavior report.

4. The method of claim 3, wherein classifying an intrusion signature for the network intrusion further comprises comparing the behavior report to a catalog of intrusion signatures maintained in the intrusion management database.

5. The method of claim 1, wherein the response redirects network traffic involving the set of nodes to protect the set of nodes.

6. The method of claim 1, wherein the response applies a security patch to the set of nodes in response to determining that the protocol or application targeted by the network intrusion becomes active.

7. The method of claim 2, wherein the node workload includes information regarding the network traffic load and an active application of the set of nodes.

8. The method of claim 7, further comprising:
   correlating, by a traffic agent, a relationship between the active application and the network traffic load; and
   providing, to the intrusion management database, information regarding the relationship between the active application and the network traffic load.

9. The method of claim 2, further comprising reporting, by the set of nodes, protocol data and port use activity data to the intrusion management database.

10. A system for network intrusion management, the system comprising:
    a memory configured to store a catalog of intrusion signatures and security response protocols; and
    a processing unit coupled to the memory and configured to:
    monitor a set of nodes of a computer network;
    determine a node workload for the set of nodes;
    classify, in response to detecting a network intrusion related to the set of nodes, an intrusion signature for the network intrusion;
    determine a response for managing a security vulnerability of the set of nodes based on the node workload and the intrusion signature; and
    instantiate the response to the set of nodes;
    wherein the processing unit is configured to determine the response by:
    determining a protocol or an application targeted by the network intrusion; and
    determining that the protocol or the application targeted by the network intrusion is not active at the time of the network intrusion based on the node workload;
    wherein the response includes deferring application of a security patch for the network intrusion based on determining that the protocol or the application targeted by the network intrusion is not active at the time of the network intrusion.

11. The system of claim 10, wherein to monitor the set of nodes of a computer network, the processing unit is configured to:
    identify irregular behavior in network traffic involving the set of nodes; and
    provide a behavior report.

12. The system of claim 11, wherein to classify an intrusion signature for the network intrusion, the processing unit is configured to compare the behavior report to the catalog of intrusion signatures stored in the memory.

13. The system of claim 10, wherein the response redirects network traffic involving the set of nodes to protect the set of nodes.

14. The system of claim 10, wherein the response applies a security patch to the set of nodes in response to determining that the protocol or application targeted by the network intrusion becomes active.

15. The system of claim 10, wherein the node workload includes information regarding the network traffic load and an active application of the set of nodes.

16. The system of claim 15, wherein the processing unit is further configured to:
  correlate, using a traffic agent, a relationship between the active application and the network traffic load; and
  provide information regarding the relationship between the active application and the network traffic load.

17. The system of claim 10, reporting, by wherein the set of nodes are configured to report protocol data and port use activity data to the processing unit.

18. A computer program product comprising a non-transitory computer readable storage medium having a computer readable program stored therein, wherein the computer readable program, when executed on a first computing device, causes the first computing device to:
  monitor a set of nodes of a computer network;
  determine a node workload for the set of nodes;
  classify, in response to detecting a network intrusion related to the set of nodes, an intrusion signature for the network intrusion;
  determine a response for managing a security vulnerability of the set of nodes based on the node workload and the intrusion signature; and
  instantiate the response to the set of nodes;
  wherein the computer readable program is configured to cause the first computing device to determine the response by:
    determining a protocol or an application targeted by the network intrusion; and
    determining that the protocol or the application targeted by the network intrusion is not active at the time of the network intrusion based on the node workload;
    wherein the response includes deferring application of a security patch for the network intrusion based on determining that the protocol or the application targeted by the network intrusion is not active at the time of the network intrusion.

19. The computer program product of claim 18, further comprising:
  computer readable program code to identify irregular behavior in a network traffic load of the set of nodes;
  computer readable program code to provide a behavior report; and
  wherein classifying an intrusion signature for the network intrusion further comprises comparing the behavior report to a catalog of intrusion signatures.

20. The computer program product of claim 19, further comprising:
  computer readable program code to correlate a relationship between an active application and a node workload, the node workload including information regarding the network traffic load and an active application of the set of nodes;
  computer readable program code to provide information regarding the relationship between the active application and the network traffic load; and
  computer readable program code to report protocol data and port use activity data.

* * * * *